(12) United States Patent
Chen et al.

(10) Patent No.: US 11,520,737 B2
(45) Date of Patent: Dec. 6, 2022

(54) BLOCKCHAIN-AS-A-SERVICE INTEGRATED HYBRID OBJECT STORAGE SYSTEM IN MULTI-CLOUD COMPUTING ENVIRONMENT

(71) Applicant: EMC IP Holding Company LLC, Hopkinton, MA (US)

(72) Inventors: Si Chen, Shanghai (CN); Pengfei Wu, Shanghai (CN); Zhenzhen Lin, Shanghai (CN); Ruixue Zhang, Shanghai (CN); Joel Christner, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 444 days.

(21) Appl. No.: 16/561,221

(22) Filed: Sep. 5, 2019

(65) Prior Publication Data

US 2021/0073177 A1 Mar. 11, 2021

(51) Int. Cl.
| | |
|---|---|
| *G06F 16/182* | (2019.01) |
| *G06F 16/13* | (2019.01) |
| *G06F 16/16* | (2019.01) |
| *H04L 67/1097* | (2022.01) |
| *H04L 9/06* | (2006.01) |

(Continued)

(52) U.S. Cl.
CPC .......... *G06F 16/137* (2019.01); *G06F 16/164* (2019.01); *G06F 16/182* (2019.01); *G06F 16/188* (2019.01); *H04L 9/0637* (2013.01); *H04L 9/3213* (2013.01); *H04L 67/1097* (2013.01)

(58) Field of Classification Search
None
See application file for complete search history.

(56) References Cited

U.S. PATENT DOCUMENTS

2019/0268277 A1* 8/2019 Asthana .................... H04L 9/50
2020/0252404 A1* 8/2020 Padmanabhan ....... H04L 63/061

OTHER PUBLICATIONS

Demichev et al. Sep. 2019. Hyperledger-based Data Provenance in Distributed Computing Environments, pp. 1-9.*

(Continued)

*Primary Examiner* — Tuankhanh D Phan
(74) *Attorney, Agent, or Firm* — Ryan, Mason & Lewis, LLP

(57) ABSTRACT

Techniques for improved storage in a multi-cloud computing environment are provided. For example, a system manager for a storage system comprises a client interface layer configured to provide one or more application programing interfaces for one or more clients accessing the storage system, and a client interface layer handler configured to manage the one or more application programing interfaces of the client interface layer. Further, the system manager comprises a unified storage resource interface layer configured to provide a set of application programming interfaces to enable access for the one or more clients to a storage resource layer operatively coupled to the unified storage resource interface layer. The storage resource layer comprising one or more public cloud platform-based storage resources and a blockchain manager that coordinates access to one or more enterprise-level storage resources and one or more individually-owned storage resources.

20 Claims, 5 Drawing Sheets

(51) Int. Cl.
*H04L 9/32* (2006.01)
*G06F 16/188* (2019.01)

(56) References Cited

OTHER PUBLICATIONS

J. Frankenfield, Investopedia, "Blockchain-as-a-Service (BaaS)," https://www.investopedia.com/terms/b/blockchainasaservice-baas.asp, May 17, 2018, 8 pages.
Minio, Inc., "MinIO Object Storage," https://min.io/product, 2019, 5 pages.
Scality, Inc. "About Zenko," https://zenko.readthedocs.io/en/latest/operation/Introduction/index.html, Aug. 21, 2019, 1 page.

\* cited by examiner

100

200

201

400

BLOCKCHAIN-AS-A-SERVICE INTEGRATED HYBRID OBJECT STORAGE SYSTEM IN MULTI-CLOUD COMPUTING ENVIRONMENT

FIELD

The field relates generally to computing environments, and more particularly to storage systems in multi-cloud computing environments.

BACKGROUND

Enterprises such as corporations typically utilize a cloud computing environment to host their applications, services and data. One or more cloud platforms that are part of this environment may be within the exclusive control and management of the enterprise, and therefore are considered "private clouds." On the other hand, the cloud computing environment may include one or more cloud platforms that can be used by multiple enterprises, and are not necessarily controlled or managed by any of the multiple enterprises but rather are controlled and managed by one or more third-party cloud providers (or cloud vendors). Such cloud platforms are typically considered "public clouds." More typically, enterprises may choose to host their applications, services and data on a combination of one or more private clouds and/or one or more public clouds that form a "multi-cloud computing environment."

Cloud platforms that are part of such a multi-cloud computing environment utilize reconfigurable virtual resources operating on top of physical resources (sometimes collectively referred to herein as "cloud resources") to meet changing user needs in an efficient, flexible and cost-effective manner. For example, cloud platforms typically use various types of virtualization techniques including operating system level virtualization techniques that implement resources such as containers and/or virtual machines, logical storage units, and the like. However, significant challenges remain in the implementation of multi-cloud computing environments such as, for example, cloud vendor lock-in (e.g., inability or difficulty in utilizing another cloud provider for data storage that can lead to data silos among other data storage issues) and a lack of cross-cloud data storage capability.

SUMMARY

Embodiments of the invention provide techniques for improved storage in a multi-cloud computing environment.

For example, in one embodiment, an apparatus comprises one or more processors operatively coupled to one or more memories and configured to form a system manager for a storage system. The system manager comprises a client interface layer configured to provide one or more application programing interfaces for one or more clients accessing the storage system, and a client interface layer handler operatively coupled to the client interface layer and configured to manage the one or more application programing interfaces of the client interface layer. Further, the system manager comprises a unified storage resource interface layer operatively coupled to the client interface layer handler and configured to provide a set of application programming interfaces to enable access for the one or more clients to a storage resource layer operatively coupled to the unified storage resource interface layer. The storage resource layer comprising one or more public cloud platform-based storage resources and a blockchain manager that coordinates access to one or more enterprise-level storage resources and one or more individually-owned storage resources.

Advantageously, illustrative embodiments provide for flexible blockchain-as-a-service storage (BaaS) solutions that overcome many multi-cloud computing environment drawbacks such as, but not limited to, cloud vendor lock-in and a lack of cross-cloud data storage capability.

These and other features and advantages of the invention will become more readily apparent from the accompanying drawings and the following detailed description.

DETAILED DESCRIPTION

Figure 1:
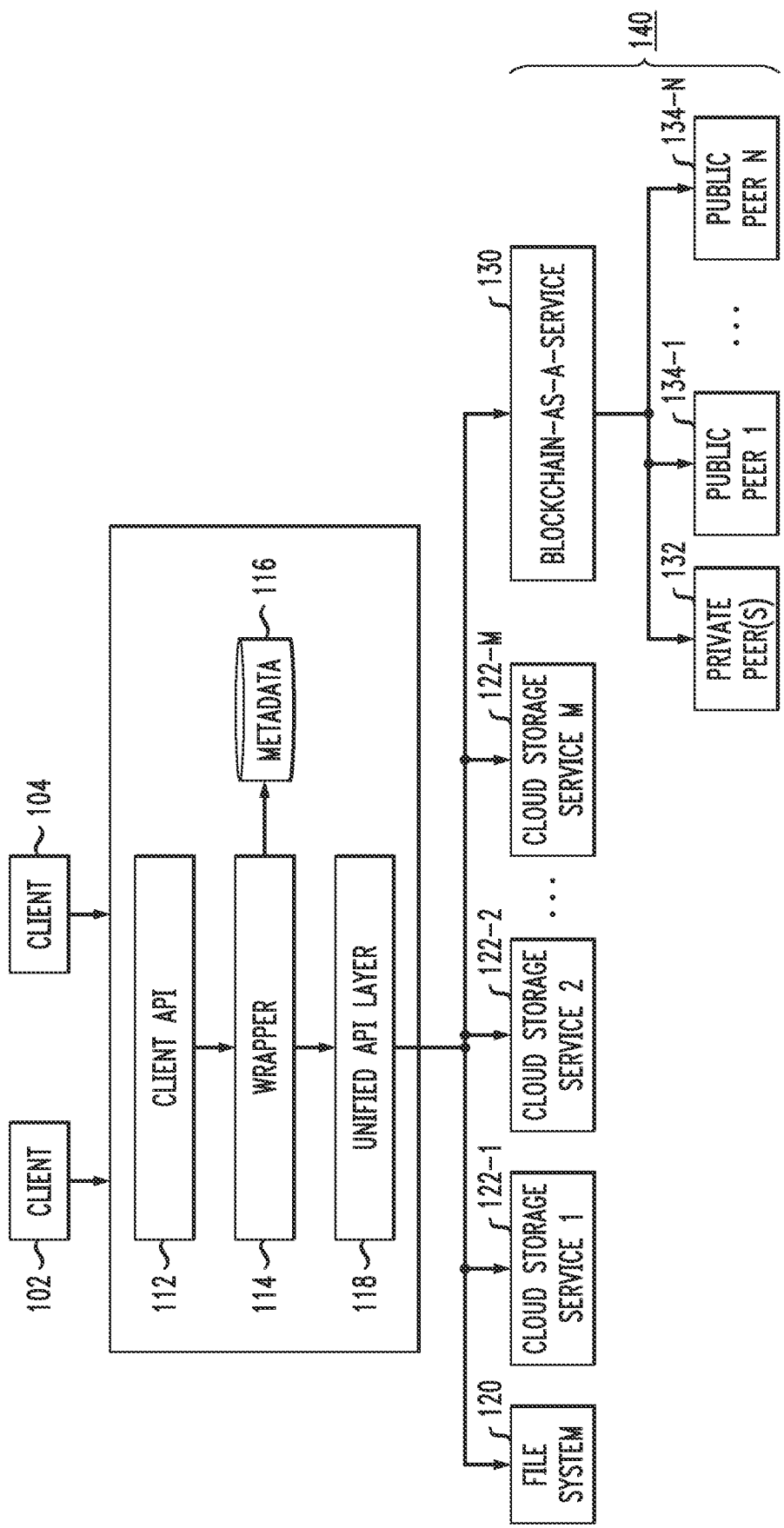
FIG. 1 is a block diagram of an architecture for a blockchain-as-a-service integrated hybrid object storage system, according to an embodiment of the invention.

Illustrative embodiments may be described herein with reference to exemplary computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the background section, storage provider lock-in creates an environment adverse to data management in a multi-cloud computing environment. There are no native tools or automation mechanisms for data migration or movement across cloud providers. Furthermore, as both business and application requirements change, a need for data storage across multiple cloud providers has become a reality. As a result, it is realized herein that presenting a unified approach for storing data across multiple cloud providers with seamless mobility and protection is required and fundamental. Moreover, with increasing capacity demand and storage size owned by individuals, solutions to integrate these resources are also realized to be needed in the storage and data management industries.

Storage provider lock-in creates a storage solution adverse to data protection in a multi-cloud computing environment. As computing environments enter a multi-cloud era, and as both economics and application requirements change, it is realized herein that customers need the ability to: (i) store their data across multiple clouds and on-premise object stores; (ii) replicate or migrate their data between object stores from different providers; and (iii) call storage services in a unified manner regardless the differences between providers. However, customers may be locked into a single provider for storage services due to that fact that: (i) data protection relies on replication for high availability; and/or (ii) a lack of native tools or an automation mechanism for data replication or movement across cloud providers.

It is further realized herein that with the increase of storage resources owned by individual entities (as compared to large enterprise storage providers), not only can cloud vendors provide storage services, but hybrid solutions based on enterprises and individual storage owners can be implemented as part of a storage solution. As compared to an enterprise storage service, a storage service based on individual community storage resources can deal with small individual storage requirements, non-high availability storage requirements, etc. Such a storage service can provide a less expensive solution option for individual clients and provide an opportunity for individual storage owners to share their storage and gain profits. Therefore, it is realized herein that the growing community storage resource environment can provide a competitive solution for different business requirements.

As an emerging technology, blockchain has gained significant attention from large technology companies. Developing solutions for integrating blockchain into a business scenario is and will continue to be an important field of endeavor, which could create potential revenue (value) for specific products or enterprise brands. It is realized herein that a blockchain-as-a-service (BaaS) architecture can be an applicable solution, which can provide a centralized and/or decentralized approach to share and consume storage resources.

A key drawback of individual storage resources, compared to enterprise storage services, is that no enterprise standard is provided. Each individual peer may be offline due to occasional power-off or network issues. Besides, each individual peer may subjectively revoke registration from a chain-based platform. Therefore, an approach which directly builds the connection between owners and clients for sharing and consuming storage may not provide a sufficiently high enough level of performance, e.g., may not satisfy a high-level service level agreement (SLA).

It is therefore advantageous to have an option which provides enterprise standard storage for individual clients. As mentioned above, it is realized that the business value of community storage resources is apparent, and the approach is straightforward. Though it may not provide a high-level SLA, it still could be an appropriate choice for some scenarios. However, a client who is attracted may be concerned that a future need for high-level SLA will lead to a storage issue at that time. Therefore, it is realized herein that if the approach has an additional option which provides enterprise standard storage, it would be more advantageous.

Illustrative embodiments overcome the above and other drawbacks associated with cloud storage environments by providing an approach for businesses to store and manage their data in a flexible storage solution environment. More particularly, illustrative embodiments provide an architecture for a unified object storage system and integrate individual storage resources using a digital ledger system such as blockchain. This approach provides a unified entry point for clients and supports data movement and migration by abstracting away implementation differences between storage providers. This architecture is also an advantageous solution for individual storage owners and clients, incentivizing them to share spare storage resources and addressing their storage requirements. Such a unified hybrid object storage architecture in a multi-cloud computing environment elastically unifies different storage providers in the "backend" of the storage environment, and provides interfaces to integrate complementary individual storage services with a blockchain-a-as-service (BaaS) architecture.

More particularly, in illustrative embodiments, a BaaS integrated hybrid object storage system provides a uniform object storage system which unifies storage services from different cloud providers and leverages BaaS to integrate individual storage resources. One or more embodiments provide a Plug-and-Play (PnP) model whereby whenever any new cloud providers or individual peers join in the backend, they provide storage services immediately without concerns about whether clients need to migrate or replicate data manually.

FIG. 1 illustrates an architecture 100 for a BaaS integrated hybrid object storage system, according to an illustrative embodiment. As shown, BaaS integrated hybrid object storage system architecture 100 enables a plurality of clients, in this example, client 102 and client 104 to access a system manager 110 of the architecture 100 via a client application programming interface (API) 112. The system manager 110 also comprises a wrapper module 114, a metadata store 116 and a unified API layer 118, which will be described below in detail. The system manager 110 is coupled via unified API layer 118 to a plurality of storage resource options including, but not limited to, file system 120, cloud storage services 122-1, 122-2, . . . 122-M, and storage resource options available through BaaS manager 130 including, but not limited to, storage resources available from one or more enterprise level standard storage services via private peer(s) 132 and storage resources available from one or more individual storage owners via public peers 134-1, . . . 134-N. All or part of file system 120, cloud storage services 122-1, 122-2, . . . 122-M, BaaS manager 130, private peer(s) 132 and public peers 134-1, . . . 134-N may collectively be considered a backend 140 of the storage system architecture 100, while all or part of the system manager 110 may collectively be considered a "front end" of the storage system architecture 100. In illustrative embodiments, cloud storage services 122-1, 122-2, . . . 122-M are cloud platforms provided by different public cloud providers. By way of example only, one of cloud storage services 122-1, 122-2, . . . 122-M can be a Dell EMC Elastic Cloud Service (ECS), another can be Amazon Web Services Simple Storage Service (AWS S3), and yet another can be Microsoft Azure Storage Service, each of which provide a different object storage service. It is to be understood that the above-mentioned public cloud services are examples and thus embodiments of the invention are not limited thereto.

Thus, as explained above, in backend 140, a heterogeneous storage layer is provided, which includes file system 120, cloud storage services 122-1, 122-2, . . . 122-M, and BaaS manager 130 and peers. File system 120 represents the typical traditional storage solution. In some embodiments, raw data can also be routed and pushed into file system 120 by unified API layer 118, then the metadata of the raw data which includes location information is persisted into metadata store 116.

For solution providers, architecture 100 integrates community storage resources (public peers 134-1, . . . 134-N) which typically increase rapidly and are typically available (unoccupied). Furthermore, architecture 100 provides storage services (cloud storage services 122-1, 122-2, . . . 122-M) for enterprise clients, as well as an enterprise standard storage service (private peer(s) 132) for individual clients. Individual clients and/or enterprise clients are collectively depicted as client 102 and client 104 in FIG. 1.

For enterprise clients, storage service is provided in a unified manner, so that differences of different storage providers are hidden in the backend 140 (i.e., transparent to the client). Furthermore, one or more new storage vendors may be dynamically integrated into the backend 140 in a PnP mode.

For individual clients, they may not need a high-level SLA to store data for backup. So, community storage resources can match their needs. With architecture 100, an additional option is provided which provides enterprise standard level storage service (via private peer(s) 132). Therefore, individual clients can leverage such enterprise standard storage option to store data which needs high-level SLA performance without lock-in issues.

For individual storage owners, architecture 100 provides a platform to share their spare storage resources. The BaaS environment provides an opportunity for them to earn rewards (e.g., revenue, value, etc.) with their spare storage resources, and the solution provider guarantees storage services for clients.

The following descriptions will further illustratively explain core modules of the architecture 100.

As mentioned above, system manager 110 provides client access to the storage system architecture 100 in the form of a client API 112. It is to be appreciated that client API 112 represents a unified API access module including multiple APIs as needed. That is, the storage system architecture 100 exposes any API interfaces as needed including, by way of example only, Amazon S3 or Dell ECS on the front of the architecture and encapsulates various cloud storage clients as well as the BaaS on the backend 140 of the architecture 100. The exposed unified APIs depend on business requirements. For example, client API 112 can provide a data movement or migration API to provide functionalities to enable transforming the backend storage vendors or avoiding data silos.

The wrapper module 114 functions as an API handler or manager. The wrapper implementation is centralized in some embodiments and decentralized in other embodiments. In a centralized embodiment, as shown in FIG. 1, the wrapper module 114 functions as the API manager and metadata store 116 is a database coupled to the wrapper module 114. Below a description of a decentralized embodiment for the wrapper module is explained in the context of FIG. 4 whereby performance, throughput and replication requirements are taken in consideration in further stages.

It is to be appreciated that the wrapper module 114 and the metadata store 116 highly depend on different business logic. In general, the wrapper module 114 is configured for providing and/or assisting with the following operations: data reading, data writing, data routing, generating a cryptographic key (e.g., hash) of the raw data, and mapping the key with the location (within the backend 140) where the raw data is stored. Furthermore, in some embodiments, the wrapper module 114 is implemented with replication and/or migration functionalities, as well as other features.

The unified cloud storage API layer 118 unifies different cloud storages in backend 140 and, in certain embodiments, is implemented in an abstract manner to provide PnP functionality.

BaaS manager 130 is a module that integrates the individual storage peers with the blockchain system. Not only can enterprise storage vendors be plugged into architecture 100, but individual storage owners can also share their spare storage resources, for example, to earn rewards (e.g., be paid for the use of their storage resources). A storage solution provider can also leverage the individual storage peers to provide different storage service levels of SLAs and prices. Note that private peer(s) 132 and public peers 134-1, . . . 134-N respectively represent the storage resources available from the storage providers (enterprise and individual owners) that function as part of the blockchain. Note that a "peer" is an entity that participates in a blockchain system, as will be further explained below.

As used herein, the terms "blockchain" and "distributed ledger" may be used interchangeably. As is known, the blockchain or distributed ledger protocol is implemented via a distributed, decentralized computer network of compute nodes. The compute nodes are operatively coupled in a peer-to-peer communications protocol, and thus also referred to as peers (e.g., private peer(s) 132 and public peers 134-1, . . . 134-N). In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and a block may include a timestamp, current transaction data, and information linking it to a previous block. More particularly, each subsequent block in the blockchain is a data block that includes a given transaction(s) and a hash value of the previous block in the chain, i.e., the previous transaction. Each block can therefore be representative of a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the distributed ledger. Typically, for example, the new transaction is broadcast to all or a subset of nodes within the network, inspected, and formally committed to the blockchain when a consensus among the nodes is reached that the entry is valid.

By way of example only, in the case of a "bitcoin" type implementation of a blockchain distributed ledger, the blockchain contains a record of all previous bitcoin exchanges that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, Hyperledger, and the like, may be employed in alternative embodiments.

Recall as mentioned above that, with respect to a multi-cloud computing environment, there is no existing native cloud tool or automation mechanism for data replication or movement across different cloud providers, which leads to issues such as vendor lock-in and data silos. Thus, advantageously, storage system architecture 100 provides a unified way to integrate different storage vendors, e.g., cloud storage services 122-1, 122-2, . . . 122-M in FIG. 1. As mentioned above, the wrapper module 114 is implemented in a centralized mode in illustrative embodiments. The implementation of the centralized solution is straightforward. In one or more illustrative embodiments, replication within a multi-cloud cluster (e.g., two or more clouds from cloud storage services 122-1, 122-2, . . . 122-M in FIG. 1) is straightforward. Transparent migration is enabled across clouds via a locking mechanism or the like. Migration is an additional feature which is implemented in embodiments of architecture 100. The internal logic is a "blackbox" and is transparent to clients. In order to guarantee high availability and data consistency when implementing a migration feature, in certain embodiments, algorithms such as read-write locks are applied.

Figure 2A:
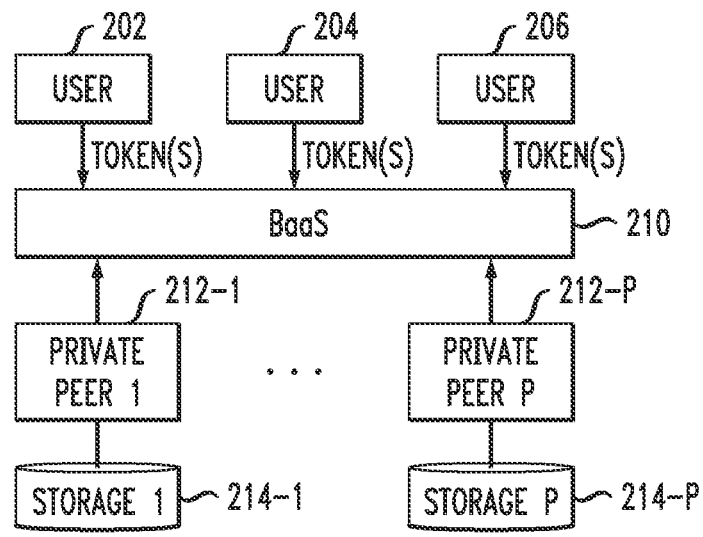
FIG. 2A is a block diagram of an initial stage of a blockchain-as-a-service in a hybrid object storage system, according to an embodiment of the invention.
Figure 2B:
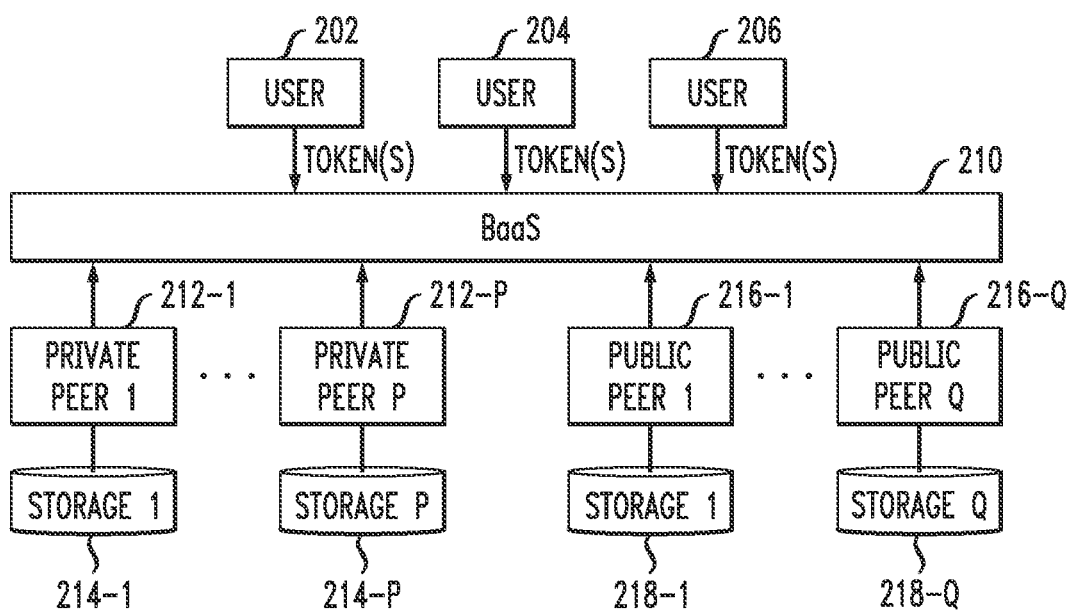
FIG. 2B is a block diagram of a subsequent stage of a blockchain-as-a-service in a hybrid storage object system, according to an embodiment of the invention.

Turning now to FIGS. 2A and 2B, multiple stages of a blockchain-as a-service (BaaS) in the hybrid object storage system architecture 100 will now be explained. More particularly, FIG. 2A depicts an initial BaaS stage and FIG. 2B depicts a subsequent BaaS stage.

As shown in initial BaaS stage 200 in FIG. 2A, multiple users 202, 204 and 206 (e.g., corresponding to one or more of clients 102 and 104 in FIG. 1) are coupled to BaaS manager 210 (i.e., corresponding to BaaS manager 130 in FIG. 1). BaaS manager 210, in initial stage 200, is coupled to a plurality of private peers, 212-1, . . . 212-P, each peer with its own storage resources(s) 214-1, . . . 214-P. In some embodiments, private peers 212-1, . . . 212-P are part of the same enterprise storage provider such that the storage resources(s) 214-1, . . . 214-P are part of one or more backend storage racks that collectively provide a consistent enterprise standard storage service. While private peers, 212-1, . . . 212-P are part of the same enterprise storage provider, one or more of the private peers may be physically remote (e.g., globally distributed) from other ones of the private peers providing a global storage service.

From the perspective of users 202, 204 and 206, in some embodiments, any user can register itself on the blockchain with a private key and public key pair (similar to bitcoin). For example, the user can submit a storage request to the BaaS manager 210, and one of private peers 212-1, . . . 212-P can accept the request. In some embodiments, the given peer may request one or more tokens (as shown) from the user for use of the storage service. In some embodiments, provision of the storage service paid with by one or more tokens can be verified by other peers automatically and independently based on a smart contract.

In this initial BaaS stage 200, it is assumed in an illustrative embodiment that the blockchain is not used to store data. Data is stored off-chain, while the transactions are logged on the blockchain, verifiable by all the peers independently. More particularly, in an illustrative embodiment, in the initial stage 200 of the BaaS, a large storage provider leads the startup and attracts users who require enterprise standard storage service. For example, all the backend storage racks could be the same as the traditional ones, providing consistent enterprise standard storage service. In this stage, all the data are off-chain into the backend storage, i.e., only transactions are logged and verified by blockchain peers. When the BaaS 210 enters a mature stage (see FIG. 2B described below), the underlying blockchain can be opened to the public, so that peers with storage space can join the blockchain, and data in relatively small sizes can be stored on-chain. In architecture 100, BaaS 210 acts as a plugged-in storage solution component, similar to how the traditional file system (120 in FIG. 1) and cloud storage services (122-1, 122-2, . . . 122-M) cooperate.

As shown in a subsequent (mature) BaaS stage 201 in FIG. 2B, the underlying blockchain is opened to public peers so that individual peers can join the blockchain and use the infrastructure to make available their own free storage space to users 202, 204 and 206. For example, plurality of public peers, 216-1, . . . 216-Q is shown where each peer has its own storage resources(s) 218-1, . . . 218-Q.

In some scenarios, the storage service provided by the individual peers (public peers) may not be as not robust as the storage service provided by the initial storage provider (private peers). However, in such scenarios, the user is free to choose the storage service provided by different entities based on price and/or performance. The inclusion of independent individual peers into the blockchain storage system also has the advantage that when the initial storage provider only has a limited number of data centers available, other locations are available (albeit perhaps with slower connectivity). In some scenarios, the local individuals (public or community peers) can provide storage service as a complementary part of the storage service provided by the initial storage provider (private peers).

Though the blockchain storage system is initialized by a large storage provider, once the individuals join the network, the blockchain is no longer only owned by a single large provider. Any operations on the blockchain can be verified by all the peers independently, such that all participants can verify that any smart contract digitally signed by the users and providers are fulfilled by both parties. Once the blockchain based storage sharing system enters the mature stage (e.g., 201 in FIG. 2B), the underlying blockchain network itself provides the decentralized storage service, as the decentralized infrastructure.

Furthermore, though the large storage provider does not "own" the blockchain any longer after the initial stage, the high-performance servers and large number of tokens owned by the company can provide much better performance of the blockchain than any other existing public chain.

As described above, providing blockchain as a service to integrate community resources may be advantageous, but also could raise concerns that a client (user) will also need a high-level SLA or enterprise standard storage service in the future. As such, the BaaS approach described herein in accordance with various embodiments provides an additional option to individual clients with different levels of services or performance to address various requirements.

Figure 3:
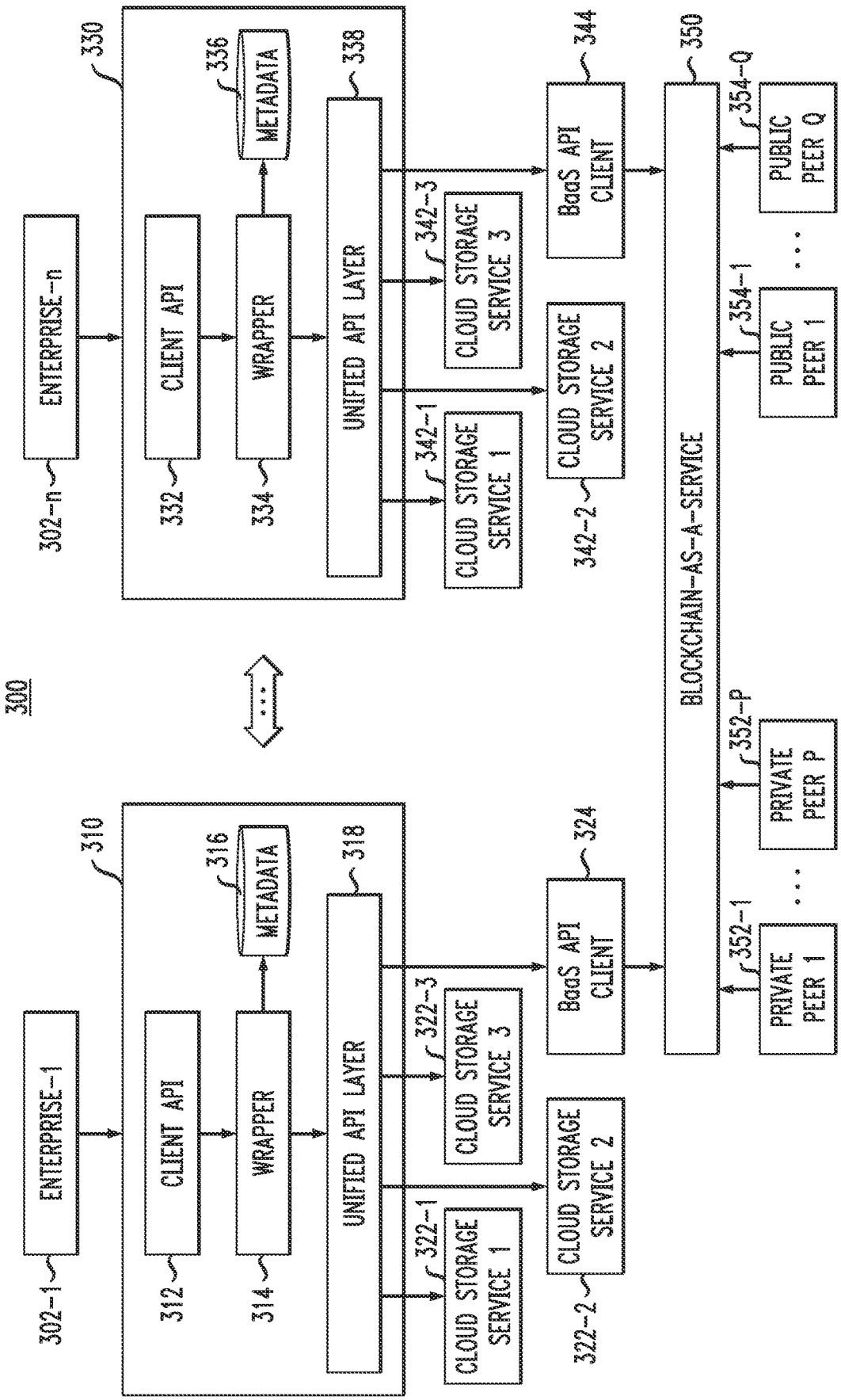
FIG. 3 is a block diagram of a centralized mode of operation for a blockchain-as-a-service integrated hybrid object storage system, according to an embodiment of the invention.

Furthermore, it is realized that enterprises as well as individual clients may have some form of an existing cloud environment solution, however, such solutions do not provide unified object storage functionalities across cloud providers, which has become necessary in many scenarios. Thus, in accordance with one or more illustrative embodiments, a standard configurable BaaS API layer can be integrated into such existing solution. Advantageously, a solution provider can initialize the uniform standard blockchain-as-a-service as a complementary storage service for their existing storage solution. FIG. 3 depicts this API layer-integrated (centralized) mode of operation 300 for a BaaS integrated hybrid object storage system, according to an embodiment of the invention.

As shown, an enterprise 302-1 is coupled to a system manager 310 of the architecture via a client API 312. The system manager 310 also comprises a wrapper module 314, a metadata store 316 and a unified API layer 318, which are described above in detail. The system manager 310 is coupled via unified API layer 318 to a plurality of storage resource options including cloud storage services 322-1, 322-2 and 322-3. A BaaS API client 324 is coupled to a centralized BaaS manager 350 which is integrated with storage resources available from one or more enterprise level standard storage services via private peer(s) 352-1, . . . 352-P and storage resources available from one or more individual storage owners via public peers 354-1, . . . 354-Q. Similarly, an enterprise 302-n is coupled to a system manager 330 of the architecture via a client API 332. The system manager 330 also comprises a wrapper module 334, a metadata store 336 and a unified API layer 338, which are described above in detail. The system manager 330 is coupled via unified API layer 338 to a plurality of storage resource options including cloud storage services 342-1, 342-2 and 342-3. A BaaS API client 344 is coupled to centralized BaaS manager 350 which, as mentioned above, is integrated with storage resources available from one or more enterprise level standard storage services via private peer(s) 352-1, . . . 352-P and storage resources available from one or more individual storage owners via public peers 354-1, . . . 354-Q.

Figure 4:
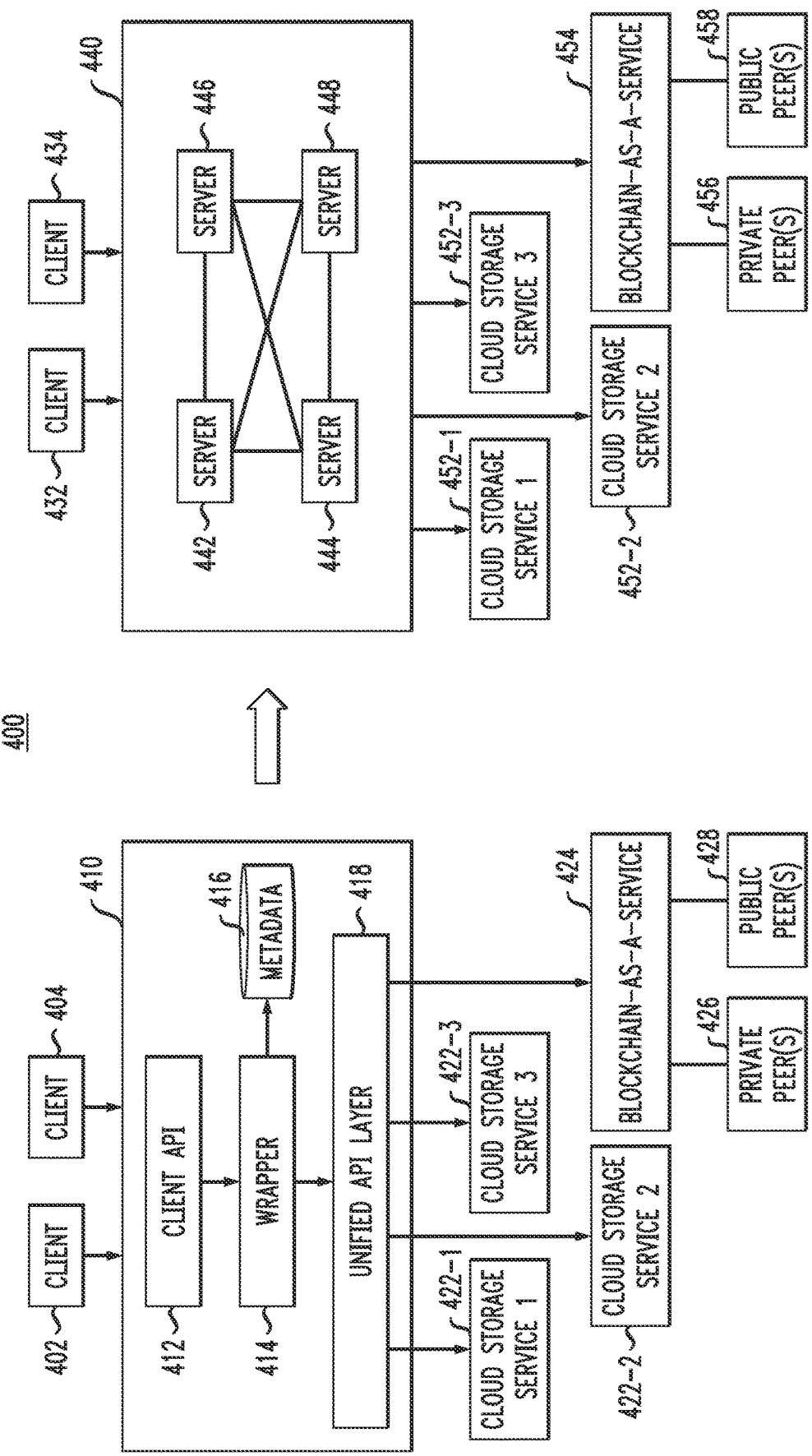
FIG. 4 is a block diagram of a decentralized mode of operation for a blockchain-as-a-service integrated hybrid object storage system, according to an embodiment of the invention.

In above descriptions, the storage system architecture is explained based on the assumption that the wrapper module is implemented with a centralized design. Since the solution to implement this module is straightforward, a decentralized implementation is also contemplated according to alternative embodiments. FIG. 4 is a block diagram of a decentralized mode of operation 400 for a blockchain-as-a-service integrated hybrid object storage system, according to an embodiment of the invention.

As shown, client 402 and client 404 access a system manager 410 via a client API 412. The system manager 410 also comprises a wrapper module 414, a metadata store 416 and a unified API layer 418, which will be described below in detail. The system manager 410 is coupled via unified API layer 418 to a plurality of storage resource options including cloud storage services 422-1, 422-2 and 422-3, and storage resource options available through BaaS manager 424 including private peer(s) 426 and storage resources available from public peer(s) 428, as explained in detail above. As further shown, client 432 and client 434 access a plurality of servers 440 including servers 442, 444, 446 and 448. The plurality of servers 440 are coupled to a plurality of storage resource options including cloud storage services 452-1, 452-2 and 452-3, and storage resource options available through BaaS manager 454 including private peer(s) 456 and storage resources available from public peer(s) 458, as explained in detail above. It is to be appreciated that the plurality of servers 440 represent a decentralized architecture. Various decentralized algorithms can be applied to build the decentralize structure including, but not limited to, consistent hashing, distributed hash tables, etc. The implementation is straightforward. Each server in the plurality of servers 440 could act as a peer, and handle requests from clients.

Accordingly, the decentralized architecture in FIG. 4 as compared to the centralized architecture in FIG. 3 changes the design in terms of system/BaaS management, while the other components of the architecture would remain the same or similar in functionalities.

Figure 5:
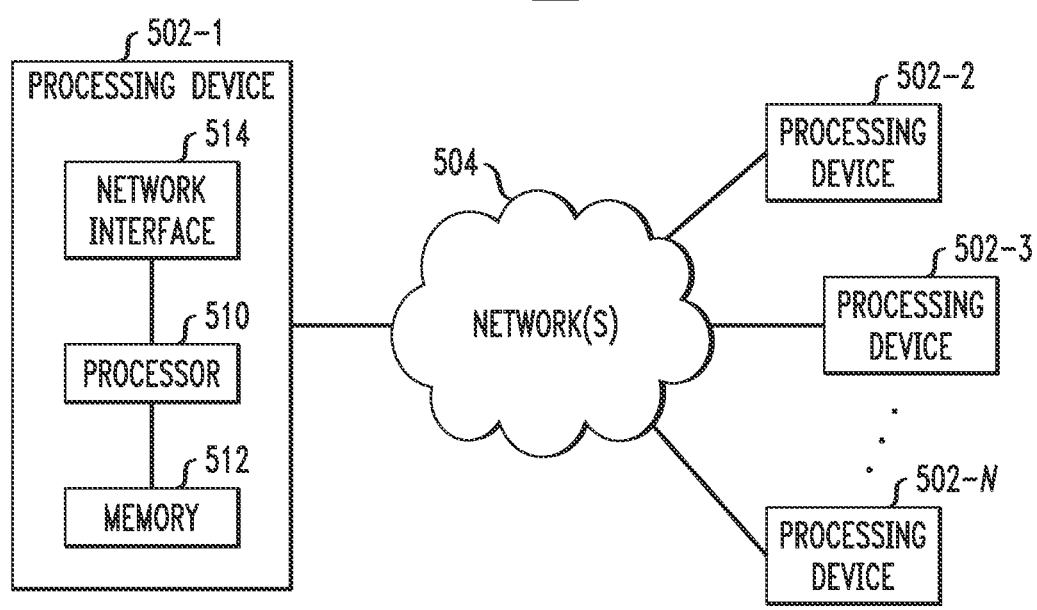
FIG. 5 illustrates a processing platform used to implement an architecture for a blockchain-as-a-service integrated hybrid object storage system, according to an embodiment of the invention.

FIG. 5 illustrates a processing platform 500 used to implement an architecture for a blockchain-as-a-service integrated hybrid object storage system, according to an embodiment of the invention. More particularly, processing platform 500 is a processing platform on which a computing environment with blockchain-as-a-service integrated with hybrid object storage functionalities (e.g., FIGS. 1-4 and otherwise described herein) can be implemented.

The processing platform 500 in this embodiment comprises a plurality of processing devices, denoted 502-1, 502-2, 502-3, . . . 502-N, which communicate with one another over network(s) 504. It is to be appreciated that the methodologies described herein may be executed in one such processing device 502, or executed in a distributed manner across two or more such processing devices 502. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures in FIGS. 1-4 can comprise one or more of such processing devices 502 shown in FIG. 5. The network(s) 504 represent one or more communications networks that enable components to communicate and to transfer data therebetween, as well as to perform other functionalities described herein.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random-access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the networks 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the system shown as 500 in FIG. 5 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus, comprising:
   one or more processors operatively coupled to one or more memories and configured to form a system manager for a storage system, the system manager comprising:
   a client interface layer configured to provide one or more application programing interfaces for one or more clients accessing the storage system;
   a client interface layer handler operatively coupled to the client interface layer and configured to manage the one or more application programing interfaces of the client interface layer; and
   a unified storage resource interface layer operatively coupled to the client interface layer handler and configured to provide a set of application programming interfaces to enable access for the one or more clients to a storage resource layer operatively coupled to the unified storage resource interface layer, the storage resource layer comprising a cloud storage type resource and a blockchain storage type resource;
   wherein the cloud storage type resource comprises one or more public cloud platform-based storage resources and wherein the blockchain storage type resource comprises a blockchain manager associated with a blockchain, the blockchain manager enabling access to one or more enterprise-level storage resources and one or more individually-owned storage resources coupled to the blockchain; and
   wherein access to the cloud storage type resource is independent from access to the blockchain storage type resource.

2. The apparatus of claim 1, wherein at least a portion of the system manager comprises a centralized architecture.

3. The apparatus of claim 2, wherein the blockchain manager is integrated in the storage resource layer.

4. The apparatus of claim 3, wherein the system manager is operatively coupled to a blockchain interface client which is configured to provide at least one application programming interface to the blockchain manager integrated in the storage resource layer.

5. The apparatus of claim 1, wherein at least a portion of the system manager comprises a decentralized architecture.

6. The apparatus of claim 5, wherein the blockchain manager is operatively coupled between the unified storage resource interface layer and the storage resource layer.

7. The apparatus of claim 1, wherein the unified storage resource interface layer is further configured to enable access to one or more storage resources newly added to the storage resource layer in a manner transparent to the one or more clients.

8. The apparatus of claim 1, wherein the system manager further comprises a metadata store operatively coupled to the client interface layer handler and configured to store metadata associated with data storage operations for the one or more clients.

9. A method, comprising:
providing, as part of a system manager for a storage system, a client interface layer configured to provide one or more application programing interfaces for one or more clients accessing the storage system;
providing, as part of the system manager, a client interface layer handler operatively coupled to the client interface layer and configured to manage the one or more application programing interfaces of the client interface layer; and
providing, as a part of the system manager, a unified storage resource interface layer operatively coupled to the client interface layer handler and configured to provide a set of application programming interfaces to enable access for the one or more clients to a storage resource layer operatively coupled to the unified storage resource interface layer, the storage resource layer comprising a cloud storage type resource and a blockchain storage type resource;
wherein the cloud storage type resource comprises one or more public cloud platform-based storage resources and wherein the blockchain storage type resource comprises a blockchain manager associated with a blockchain, the blockchain manager enabling access to one or more enterprise-level storage resources and one or more individually-owned storage resources coupled to the blockchain;
wherein access to the cloud storage type resource is independent from access to the blockchain storage type resource; and
wherein the system manager is implemented by one or more processors operatively coupled to one or more memories.

10. The method of claim 9, further comprising, in an initial blockchain stage, the blockchain manager initially coordinates access to the one or more enterprise-level storage resources.

11. The method of claim 10, wherein, during the initial blockchain stage, client data storage operation metadata is stored on the blockchain, wherein the blockchain is managed by the blockchain manager.

12. The method of claim 10, further comprising, in a subsequent blockchain stage, the blockchain manager coordinates access to the one or more individually-owned storage resources.

13. The method of claim 12, wherein, during the subsequent blockchain stage, client data is stored on the blockchain, wherein the blockchain is managed by the blockchain manager.

14. The method of claim 9, further comprising the system manager receiving a storage request from one of the one or more clients to storage data on the blockchain, the blockchain being managed by the blockchain manager.

15. The method of claim 14, further comprising the system manager obtaining a token from the client that sent the storage request, the token being used to access one of the one or more enterprise-level storage resources and the one or more individually-owned storage resources.

16. The method of claim 9, wherein the blockchain manager provides a blockchain-as-a-service to the one or more clients.

17. An article of manufacture comprising a processor-readable storage medium having encoded therein executable code of one or more software programs, wherein the one or more software programs when executed by one or more processors implement steps of:
providing, as part of a system manager for a storage system, a client interface layer configured to provide one or more application programing interfaces for one or more clients accessing the storage system;
providing, as part of the system manager, a client interface layer handler operatively coupled to the client interface layer and configured to manage the one or more application programing interfaces of the client interface layer; and
providing, as a part of the system manager, a unified storage resource interface layer operatively coupled to the client interface layer handler and configured to provide a set of application programming interfaces to enable access for the one or more clients to a storage resource layer operatively coupled to the unified storage resource interface layer, the storage resource layer comprising a cloud storage type resource and a blockchain storage type resource;
wherein the cloud storage type resource comprises one or more public cloud platform-based storage resources and wherein the blockchain storage type resource comprises a blockchain manager associated with a blockchain, the blockchain manager enabling access to one or more enterprise-level storage resources and one or more individually-owned storage resources coupled to the blockchain; and
wherein access to the cloud storage type resource is independent from access to the blockchain storage type resource.

18. The article of claim 17, further comprising, in an initial blockchain stage, the blockchain manager initially coordinates access to the one or more enterprise-level storage resources.

19. The article of claim 17, further comprising, in a subsequent blockchain stage, the blockchain manager coordinates access to the one or more individually-owned storage resources.

20. The article of claim 17, wherein the blockchain manager provides a blockchain-as-a-service to the one or more clients.

* * * * *